United States Patent Office 2,921,098
Patented Jan. 12, 1960

2,921,098

PROCESS FOR THE PREPARATION OF 1,1,1-TRIFLUORO-2-BROMO-2-CHLOROETHANE

Charles Walter Suckling, Widnes, and James Raventos, Blackley, England, assignors to Imperial Chemical Industries Limited, London, England, a corporation of Great Britain No Drawing. Application June 30, 1958
Serial No. 745,321

Claims priority, application Great Britain October 20, 1954

3 Claims. (Cl. 260—653)

This invention relates to the manufacture of the new halohydrocarbon 1:1:1-trifluoro-2-bromo-2-chloroethane and is a continuation-in-part of our co-pending application Serial No. 539,689, filed October 10, 1955, now Patent No. 2,849,502.

That application claims 1:1:1-trifluoro-2-bromo-2-chloroethane as a new chemical compound and describes its utilisation as an outstanding non-inflammable non-toxic inhalation anaesthetic; it also claims the preparation of the said new compound by vapor phase chlorination of 1:1:1-trifluoro-2-bromoethane. The present application relates to an alternative method of preparation which comprises the vapor phase bromination of 1:1:1-trifluoro-2-chloroethane.

We have found that 1:1:1-trifluoro-2-bromo-2-chloroethane can be made in good yield by direct reaction of bromine on 1:1:1-trifluoro-2-chloroethane in the vapor phase at a temperature in the range from about 350° to about 600° C. The reaction proceeds mainly according to the following equation:

(1) $CF_3—CH_2Cl + Br_2 \rightarrow CF_3—CHBrCl + HBr$

Conveniently the reaction is carried out by passing a mixture of the two vapors through a heated tubular reactor made, for instance, of nickel or of silica. However, it can also be carried out in other types of reaction vessels, as will be obvious to those skilled in the art. The reaction will proceed at temperatures as low as 350° C. but the degree of conversion is then low, much of the trifluorochloroethane remaining unchanged. Temperatures much in excess of 600° C. should be avoided since they lead to the formation of unduly high proportions of more highly brominated compounds, unsaturated compounds and compounds in which chlorine and/or fluorine has been replaced by bromine. Efficient conversions have been attained at temperatures in the range 425°–475° C. with a molar ratio of trifluorochloroethane to bromine in the range 1.5:1 to 2:1, as is illustrated in Examples I and II hereinafter following. Within this range, increasing the ratio of trifluorochloroethane to bromine has an effect similar to that produced by lowering the temperature; diminishing the ratio, if carried too far, may lead to over bromination.

Example I

The apparatus used consisted of a 2" x 24" silica tube packed with silica chips and enclosed in a vertical electric furnace. 1:1:1-trifluoro-2-chloroethane as vapor and bromine as liquid were introduced into a narrow tube passing down the inside of the reaction tube. The mixed reactants then passed up through the reaction tube which was maintained at a temperature of about 465° C. The reaction products were passed through a water-cooled condenser which condensed out most of the desired 1:1:1-trifluoro-2-bromo-2-chloroethane along with any high boiling by-products and unchanged bromine. This condensate was washed with dilute caustic soda solution and dried over calcium chloride. The exit gases from this condenser were scrubbed with water and dilute caustic soda solution, dried and passed to a condenser cooled with a mixture of solid carbon dioxide and trichloroethylene which caused the unchanged 1:1:1-trifluoro-2-chloroethane to condense. This second condensate was then combined with the first and the mixture was fractionally distilled.

During a run of 2 hours 620 g. of 1:1:1-trifluoro-2-chloroethane and 630 g. of bromine were fed to the reactor and the product was worked up as described above. On fractional distillation there was obtained a first cut up to 50° C. consisting substantially of unchanged 1:1:1-trifluoro-2-chloroethane, then a middle cut between 50° C. and 52° C. consisting of substantially pure 1:1:1-trifluoro-2-bromo-2-chloroethane and a higher boiling residue that contained a further quantity of the desired product together with some 1:1:1-trifluoro-2:2-dibromo-2-chloroethane. On re-distillation of the middle fraction pure 1:1:1-trifluoro-2-bromo-2-chloroethane was obtained with B.P. 50–50.5° C.

Example II

Bromine was vaporized and passed upwards at the rate of 311 g. per hour, together with 1:1:1-trifluoro-chloroethane at the rate of 451 g. per hour, through a furnace consisting of a silica tube 2" in diameter and 6' long, 3' of which was packed with silica chips and heated to 427° C. The mixed vapors from the head of the furnace were introduced at the appropriate level in a continuous still designed and operated so that hydrogen bromide passed away at the head of the still, while unchanged bromine, unchanged trifluoro-chloroethane and the organic reaction products collected in the boiler which was held at 22° C. The boiler contents continuously overflowed and were led at the appropriate level into a second continuous still operated so that unchanged trifluoro-chloroethane was stripped out. The organic reaction products and unchanged bromine were then continuously withdrawn from the second still boiler (held at 54°–55° C.) and passed to continuous washing and separating devices where they were washed first with aqueous 10% sodium hydroxide solution and then with water. Finally the product was dried and distilled, the fraction boiling at 50.2° C. at 760 mm. being collected.

During a run of 17 hours 50 minutes 5560 g. of bromine and 8050 g. of trifluoro-chloroethane were introduced into the system. 5250 g. of crude 1:1:1-trifluoro-2-bromo-2-chloroethane were obtained and 4670 g. of trifluoro-chloroethane were recovered unchanged. Fractionation of the crude product gave 4120 g. of pure 1:1:1-trifluoro-2-bromo-2-chloroethane, which represents a yield of 73.2% based on the trifluorochloroethane consumed.

The bromination efficiencies represented by these reaction conditions are thus quite satisfactory and, indeed, such as one might reasonably expect from a reaction of this nature. However, according to a particularly preferred feature of our invention we operate under higher temperature conditions and with higher molar ratios of trifluorochloroethane to bromine because we thereby gain a most unexpected advantage, now to be more fully described.

We have shown, by direct experiment, that at temperatures above about 475° C. and preferably in the range 480°–530° C., 1:1:1-trifluoro-2:2-dibromo-2-chloroethane (which forms the major part of the by-products in the reaction described above), will react at a useful rate with trifluorochloroethane with the formation of two molecular proportions of trifluorobromochloroethane. The precise mechanism of this reaction is not known with any certainty, but the overall result can be represented by the equation (2) $CF_3-CBr_2Cl + CF_3-CH_2Cl \rightarrow 2CF_3-CHBrCl$ and a practical realization of this reaction is now to be described in Examples III and IV.

*Example III*

The vapors of 1:1:1-trifluoro-2-chloroethane (191 g.) and of 1:1:1-trifluoro-2:2-dibromo-2-chloroethane (117 g.) were passed over a period of 38 min. through a silica tube 50 cm. long and 4.2 cm. internal diameter heated to 500° C. The products, except hydrogen bromide, were condensed. Fractional distillation and gas chromatographic analysis showed the products to contain unchanged 1:1:1-trifluoro-2-chloroethane (150 g.), unchanged 1:1:1-trifluoro-2:2-dibromo-2-chloroethane (22 g.), the desired 1:1:1-trifluoro-2-bromo-2-chloroethane (111 g.) and a mixture of cis and trans 1:1:1:4:4:4-hexafluoro-2:3-dichlorobutenes (6.3 g.). The hydrogen bromide was absorbed in aqueous sodium hydroxide, back titration of which showed the amount of hydrogen bromide evolved to be 7.4 g.

*Example IV*

By the method described in Example III, but with the silica tube at 530° C., vapors of 1:1:1-trifluoro-2-chloroethane (191 g.) and 1:1:1-trifluoro-2:2-dibromo-2-chloroethane (104 g.) passed through the reaction zone over 23 min. gave a product containing unchanged 1:1:1-trifluoro-2-chloroethane (153 g.), unchanged 1:1:1-trifluoro-2:2-dibromo-2-chloroethane (12 g.), the desired 1:1:1-trifluoro-2-bromo-2-chloroethane (107 g.), mixed cis and trans 1:1:1:4:4:4-hexafluoro-2:3-dichlorobutenes (7.7 g.) and hydrogen bromide (9.2 g.).

Re-fractionation of the 1:1:1-trifluoro-2-bromo-2-chloroethane formed as described above gave a high proportion in the extremely high state of purity which is requisite in anaesthetics.

The importance of this observation is, of course, that it enables us, by suitable adjustment of the conditions in which bromine and trifluorochloroethane are brought into reaction, to recover and convert to the desired end-product (trifluorobromochloroethane), most of that portion of the organic feed that would otherwise have been removed from the reaction zone in the form of the unwanted trifluorodibromochloroethane.

Further and unexpectedly advantageous features of our invention therefore comprise (a) the reaction represented in Equation 2 and illustrated in Examples III and IV above and (b) an adaptation of the conditions of what will be for convenience termed the main reaction (Equation 1) so that a large proportion of any unwanted dibromo derivative that may be formed can be quite simply reconverted to the desired end-product trifluorobromochloroethane.

This latter highly desirable object is achieved by carrying out the bromination of trifluorochloroethane at a temperature in the range 480°–530° C., with molar ratios of trifluorochloroethane to bromine in the range 2:1 to 5:1, preferably 2.5:1 to 3.5:1, the heated reaction zone being sufficiently extended that all or virtually all of the bromine has been consumed before the products have passed wholly through the zone, whereby an opportunity is afforded for the reaction of Equation 2 to take place. These conditions are quite readily achieved and are illustrated in the following Examples V to VII.

*Example V*

41.4 lbs./hr. of 1:1:1-trifluoro-2-chloroethane were vaporized and mixed with bromine vapor in the ratio of 2.98 moles of 1:1:1-trifluoro-2-chloroethane to one mole of bromine. The mixed vapors were passed through a reactor consisting of two parts, the first being a nickel tube 15 ft. long and of small cross-section (½" internal diameter) to ensure rapid heating of the vapors and the second a wider tube 6 ft. 8½ ins. long and 3" internal diameter to secure an adequate retention time. Both sections were heated to 497° C. The reaction products were passed at the appropriate level into a continuous still designed and operated so that the hydrogen bromide and unchanged trifluorochloroethane passed away from the head of the still while the crude reaction product overflowed continuously from the still boiler. The crude product was continuously washed with aqueous 10% sodium hydroxide solution and then with water, dried and distilled and 17.6 lb./hr. of 1:1:1-trifluoro-2-bromo-2-chloroethane of high purity was obtained. The unchanged trifluorochloroethane was also separated, washed, dried and distilled and recycled and taking into account the material so recovered the yield of product, calculated on the basis of the trifluorochloroethane consumed, was 80.1%.

*Example VI*

Using the plant described in Example V, 48 lb./hr. of 1:1:1-trifluoro-2-chloroethane were mixed with bromine vapor in the ratio of 3.88 moles of trifluorochloroethane to one mole of bromine and fed to the reactor maintained at 494° C. 17.3 lb./hr. of 1:1:1-trifluoro-2-bromo-2-chloroethane of high purity was obtained, the yield, based on the trifluorochloroethane consumed, being 79.0%.

*Example VII*

Using the plant described in Example V, 40.5 lb./hr. of 1:1:1-trifluoro-2-chloroethane were mixed with bromine vapor in the ratio of 2.93 moles of trifluorochloroethane to one mole of bromine and fed to the reactor maintained at 507° C. 18.9 lb./hr. of 1:1:1-trifluoro-2-bromo-2-chloroethane of high purity was obtained, the yield, based on the trifluorochloroethane consumed, being 89.7%.

As already indicated, we prefer, when using these higher temperatures, to work with molar ratios of trifluorochloroethane in the range 2:1 to 5:1. The ratio can indeed be increased beyond 5:1 and the yield of product, calculated on the weight of trifluorochloroethane consumed, is still quite good but the percentage conversion becomes so low that the process is uneconomic.

If optimum reaction conditions are to be employed, then within the temperature ranges specified, the temperature and the retention time should be suitably correlated. By the term "retention time" we mean the ratio of the volume of the reaction zone to the volume of reactants fed into that zone per unit of time; it is thus a measure of the time that any given molecule of the reactant is retained within the reaction zone and so exposed to the reaction conditions. Clearly an inadequate retention time means that the percentage conversion will be low and much unreacted starting material will have to be recycled. On the other hand, an inordinately long retention time limits the output of the plant and offers undesirable opportunities for side reactions to occur yielding unwanted by-products. In general, at higher temperatures short retention times will suffice, whereas lower temperatures call for longer retention times. No simple correlation formula can be devised that will be appropriate to the varying types of reactors that may be used and one must proceed, for any given plant, to determine by simple routine experimentation what are the optimum values of the inter-related factors, molar ratio, retention time and temperature.

As explained earlier, although temperatures above 530° C. and up to 600° C. may be used, if desired, such conditions, particularly, if combined with long retention times, tend to increase the prevalence of side reactions that lead to (a) replacement of fluorine and/or chlorine by bromine, forming, for instance, $CF_2Br-CBR_2Cl$ and (b) the formation of unsaturated compounds, particularly butene derivatives of the type, for instance, $$CF_3-CCl=CCl-CF_3$$

One such reaction, which we have shown to occur to a minor degree even in the preferred temperature range of 480°–530° C., is the following:

(3) $2CF_3-CBr_2Cl \rightarrow CF_3-CCl=CCl-CF_3+2Br_2$ this then being followed by reaction of the bromine so liberated with further quantities of trifluorochloroethane to yield an additional amount of the desired end-product (trifluorobromochloroethane) as in the initial Equation 1. This partciular reaction, then, is not wholly wasteful, in that half of the bromine that has been initially diverted to form the dibromo derivative is eventually converted to the desired end-product and, of course, the percentage conversion of trifluorochloroethane is increased. On the other hand this reaction is less profitable than that of Equation 2 wherein not only the whole of the bromine (and a corresponding additional amount of trifluorochloroethane), but also the carbon skeleton of the dibromo derivative is eventually utilized. Moreover certain butenes formed by reactions of the type of Equation 3 are only separable with difficulty from the desired end-product—a matter of grave importance in the case of a pharmaceutical preparation. Increasing temperature and increasing retention time apparently favor the butene-forming reactions at the expense of the much more profitable reaction of Equation 2 and for this reason and also because of the increased likelihood of replacing fluorine and/or chlorine by bromine, the use of temperatures above 530° C. is not to be recommended.

As will be apparent from the examples, under optimum reaction conditions a considerable proportion of the trifluorochloroethane passes through the reaction zone unchanged. After the removal from the reaction products of the hydrogen bromide, the unchanged trifluorochloroethane is stripped out and recycled. The remaining reaction products are washed free from acid, dried and fractionated, the 1:1:1-trifluoro-2-bromo-2-chloroethane being obtained as a colourless liquid of B.P. 50.2° C., refractive index at 20° C., $n_D^{20}=1.3700$ and density 1.86 g./ml. at 22° C. Its identity has been established not only by means of analysis and the physical data just listed, but also by mass spectrometry combined with nuclear magnetic resonance measurements.

What we claim is:

1. Process for the preparation of 1:1:1-trifluoro-2-bromo-2-chloroethane which comprises the interaction at a temperature in the range of 480°–530° C. of 1:1:1-trifluoro-2:2-dibromo-2-chloroethane with 1:1:1-trifluoro-2-chloroethane.

2. Process for the preparation of 1:1:1-trifluoro-2-bromo-2-chloroethane which comprises heating bromine and 1:1:1-trifluoro-2-chloroethane together at a temperature in the range 480°–530° C., with molar proportions of trifluorochloroethane to bromine in the range of 2:1 to 5:1, the heated reaction zone extending beyond the point where virtually all of the bromine in the gas stream has been consumed.

3. Process according to claim 2 wherein the molar ratio of trifluorochloroethane to bromine is in the range 2.5:1 to 3.5:1.

References Cited in the file of this patent
UNITED STATES PATENTS

| | | |
|---|---|---|
| 2,644,845 | McBee | July 7, 1953 |
| 2,849,502 | Suckling et al. | Aug. 26, 1958 |